United States Patent Office 3,362,991
Patented Jan. 9, 1968

---

3,362,991
N,N-DI-(2-PROPYNYL)-PHENYLSULFONAMIDES
George B. Sterling, Mogadore, Ohio, and Chester E. Pawloski, Bay City, Mich., assignors to The Dow Chemical Company, Midland, Mich., a corporation of Delaware
No Drawing. Filed Dec. 26, 1963, Ser. No. 333,659
2 Claims. (Cl. 260—556)

The present invention is directed to a compound corresponding to the formula

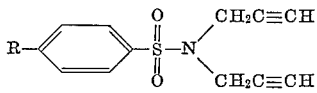

In this and succeeding formulae, R represents hydrogen or methyl. The compounds are solids which are somewhat soluble in many organic solvents and of low solubility in water. The compounds have been found to be useful as pesticides for the control of various insect, worm, bacterial, and fungal organisms such as armyworms, mites, roaches, flies and plum curculio.

The new compounds can be prepared by reacting benzene sulfonamide or p-toluenesulfonamide with a propargyl halide. The reaction is carried out in the presence of a basic material such as an alkali metal carbonate and preferably in a liquid reaction media such as isopropanol, acetone, or methyl ethyl ketone. The reaction takes place smoothly at temperatures at which halide of reaction is produced and preferably at temperatures of from about 0 to 100° C. The halide of reaction appears in the reaction mixture as a salt of the metal cation from the employed base. Good results are obtained when employing one molecular proportion of the sulfonamide with greater than one molecular proportion, and preferably an excess, of each of propargyl halide and basic material. The reaction consumes the reactants in the proportion of two moles each of the propargyl halide and the basic materials for every mole of benzene or p-toluenesulfonamide and the use of the reactants in amounts which represent such proportions is preferred when optimum yields are desired. Upon completion of the reaction the desired product can be separated and purified by conventional procedures.

In carrying out the reaction, the propargyl halide such as the chloride or bromide, the sulfonamide and basic material can be combined in any convenient fashion. However, it is preferable to disperse the reactants in a liquid medium. Following the contacting, the reaction mixture is maintained at the reaction temperatures for a period of time to insure completion of the reaction. The reaction mixture can be filtered to remove the halide of reaction and the filtrate used in pesticidal compositions or the filtrate can be further purified by conventional procedures. In a preferred procedure, the hot reaction mixture is combined with aqueous alkali metal hydroxide and heated for a short period. The alkali metal hydroxide converts any unreacted starting materials to water soluble salts which can then be removed by washing the reaction mixture with water. The organic layer, obtained during the washing procedure, can be further purified by heating to remove the low boiling constituents and obtain the products as a residue. The residue can then be crystallized from a common organic solvent.

EXAMPLE 1

*N,N-di-(2-propynyl)-benzenesulfonamide*

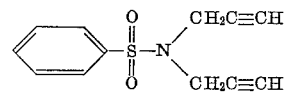

Benzene sulfonamide (27 grams), propargyl bromide (45 grams) and potassium carbonate (50 grams) were dispersed in 400 milliliters of acetone. The resulting mixture was heated with stirring at the boiling temperature and under reflux for twenty-four hours. Following this heating period the reaction mixture was combined with 60 milliliters of aqueous 33 percent sodium hydroxide solution and the mixture heated for a short period. The hot reaction mixture was then filtered to remove the halide of reaction. The filtrate was heated to remove the low boiling constituents and obtained the N,N-di-(2-propynyl)-benzenesulfonamide product as a solid residue. This product residue, when crystallized from ethanol, had a melting point of 86–88° C.

EXAMPLE 2

*N,N-di-(2-propynyl)-toluenesulfonamide* p-toluenesulfonamide (43 grams), propargyl bromide (65 grams) and potassium carbonate (70 grams) were processed as described in Example 1 except that the reaction mixture was heated for forty hours and the heated reaction mixture was combined with only 30 milliliters of aqueous 33 percent sodium hydroxide. The N,N-di-(2-propynyl)-toluenesulfonamide product was obtained as a liquid residue, refractive index of 1.5445, which solidified upon standing. The solidified product melted at 54–55.5° C.

The novel product of the present invention is useful as a pesticide for the control of the growth and killing of many plant and animal species. For such uses, the product is dispersed on an inert finely divided solid and employed as a dust. Such mixtures also may be dispersed in water with or without the aid of a surface active agent, and the resulting aqueous suspension employed as sprays. In other procedures, the product is employed as an active constituent in solvent solutions, oil-in-water or water-in-oil emulsions, or aqueous dispersions. In representative operations, aqueous dispersions containing N,N-di-(2-propynyl)-benzenesulfonamide at concentrations of 500 parts per million, gave complete kills of southern armyworms.

We claim:
1. N,N-di-(2-propynyl)-benzenesulfonamide.
2. N,N-di-(2-propynyl)-p-toluenesulfonamide.

References Cited

UNITED STATES PATENTS 2,197,851    4/1940    Dietrich _____ 260—556

JOHN D. RANDOLPH, *Primary Examiner.*

WALTER A. MODANCE, *Examiner.*

H. I. MOATZ, *Assistant Examiner.*